Patented Apr. 20, 1954

2,676,147

UNITED STATES PATENT OFFICE 2,676,147

DRILLING MUD

Rex P. Mulligan, White Plains, N. Y., assignor to Texaco Development Corporation, New York, N. Y., a corporation of Delaware No Drawing. Application November 16, 1951, Serial No. 256,825

8 Claims. (Cl. 252—8.5)

The present invention relates to well drilling through underground formations, and, more particularly, to the drilling fluids employed in such drilling operations.

The invention particularly contemplates prevention of fermentation, and mold and bacteria growth in such drilling fluids, commonly called muds, which are used in the tapping of underground reservoirs of oil, brine, gas and water. Such muds are conventionally circulated down through the drill pipe and the bit, and returned through the earth bore, in order to lubricate and cool the drill pipe and bit, to transport the cuttings to the surface, to seal and hold the traversed walls in place, to impose a hydrostatic head, preventing the escape of high pressure fluids from the traversed formation, and to perform numerous other functions.

The present invention has particular application to drilling fluids or muds containing a fermentable additive such as starchy and proteinaceous materials, which may be incorporated in the mud for the purpose of improving its wall forming characteristics and resisting the penetration and loss of fluid from the drilling mud into porous formations.

Probably the most commonly used additive for this purpose is starch either from wheat or corn which is usually prepared by cooking in water at boiling temperatures for about half an hour to form a heat hydrolyzed or a so-called solubilized product. The resultant heat hydrolyzed starch may be added to the drilling mud either before or during circulation. If the mud temperatures are reasonably high, the starch may be added in dry form.

Materials such as starch and other organic additives, being fundamentably carbohydrates with some protein content, have the disadvantage that they are subject to microbial or bacterial action, and tend to ferment or putrify under the conditions found in drilling fluids, in which case a considerable quantity of gas is formed in the well bore, a disagreeable odor is developed, and the effectiveness of the starch as a sealing medium is considerably reduced.

In accordance with the present invention, the drilling muds employed in such subsurface drilling operations, particularly a drilling fluid containing starch or like fermentable material, are treated with a compound capable of inhibiting fermentation or souring of the agent under conditions encountered in the well. More specifically, the invention contemplates the use of tetraphenyl silicates in which each of the phenyl groups may be substituted by not more than two methyl groups.

Such compounds include the tetra phenyl, tetra tolyl, and tetra xylyl silicates having a structural formula which may be represented diagrammatically as follows:

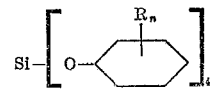

where R represents a methyl group and $n$ is a number from 0 to 2.

As indicated, the location of the methyl groups in the tolyl or xylyl groups does not appear to be critical. For example, it is contemplated employing either the ortho, meta or para tolyl silicate. In general, the thus treated mud exhibits a sustained resistance to spoilage or souring which is continuously effective over indefinite periods of time without deterioration.

The present invention is of particular advantage from the standpoint of overcoming the mud deterioration which ordinarily occurs notably in the presence of fermentable additives. Moreover, as intimated above, the thus treated fluid exhibits continuous potency as regards the suppression of fermentation indicating a high stability under drilling conditions. Therefore, the treated mud remains continuously stabilized against deterioration, subject to routine adjustment or make-up to maintain the desired composition.

The effect of this treatment is believed particularly surprising in view of the fact that common, accepted bactericidal agents such as bichloride of mercury, copper sulfate and quaternary ammonia compounds, all of which have high ratings as preservative agents, have been found generally unsatisfactory in starch preservative drilling muds.

In contrast, in accordance with the present process, the starch or a like fermentable additive is preserved against fermentation, the sealing qualities of the mud are retained throughout the drilling operations, and objectionable loss of fluid to the formations is prevented. It particularly is important to note that the treatment has no adverse effect on the viscosity or gel forming characteristics of the mud.

In general, a high order of effectiveness is realized by treating a readily souring mud with about one pound of preservative per barrel. Ordinarily, upwards of one-half a pound of treatment agent per barrel of mud results in the maximum preservative effect. However, since an excess is of no particular advantage, more than five pounds per barrel is not ordinarily contemplated for obvious economic reasons. On the other hand, the treatment with smaller quantities than the aforesaid, while ordinarily not realizing maximum benefits may be adequate in connection with drilling fluids subject to relatively minor fermentation.

In determining the efficiency of such derivatives in the preservation of starch and the like fermentable additives, a typical drilling mud was prepared using a Vollmer-Myers #5 hole mud. Starch was added to the mud in the proportion of 12 pounds of starch to one API barrel (42 gallons). This mixture provided a finished mud of a normal viscosity having a water loss of about 6.5 cc./hr. at 100 p. s. i. and 770° F., determined as hereafter explained. The starch was a prehydrolized type of starch used in drilling muds and sold under the name of "Impermex."

It is to be noted that the proportion of starch in the mud does not appear to be related to the preservation problem. The proportion of the starch used depends upon the susceptibility of a particular mud to starch treatment and the final properties desired in the mud.

One of the best tests of the progressive spoiling or souring of the mud, aside from the sour odor developed, is the water loss test which determines the wall-forming ability of the mud, and its ability to restrict the loss of water from the mud through the walls of the bore. The test in this case was conducted with a multiple cell filter press, using paper as a filter base, operating at 100 p. s. i. with a filter area approximately the same as the API 100 pound filter cell, and giving approximately the same filtration values as the API 100 pound press. The water loss is reported in cc. per hour at a pressure of 100 p. s. i. This test gives results very close to those obtained from the API Code 29 Wall Building Tester.

In conducting the tests, the stock mud above indicated is divided into as many aliquot portions as needed for the test series. Three aliquots are treated with each selected concentration of the preservative under test, the treated samples then being divided into three sets, each containing a complete series of the concentrations of each preservative. The first set is tested after standing for one week, the second set is tested after standing for two weeks, and the third set is tested after standing for three weeks.

At the completion of the testing of each set, any sample which still exhibits a water loss under 10 cc./hr. is recontaminated by inoculation with fresh soil bacteria by the addition of about one per cent by weight of fresh garden top soil. The samples are then allowed to stand two more weeks and retested as outlined above. The water-loss brake point of 10 cc./hr. as the spoiling point is an arbitrary value selected from experience. Also, since the water-loss of the original mud is about 6.5 cc./hr., it is considered that any preservative which allows or causes that much deterioration in the water-loss characteristic of the mud would be unsatisfactory for field use. The term "allowed deterioration in the water-loss characteristic" is used because in some cases the suppressed filtration characteristic of the stock mud has been observed to deteriorate without visual or odoriferous evidence of fermentation. In this case, the starch may have been subject to additional hydrolytic degradation without fermentation into the simpler carbohydrates and sugar. Apparently, these simpler substances do not have the water-loss suppressing characteristics of the prehydrated starch grains. In either case, whether the spoiling is evidenced by sight, odor or by water-loss, the mud is considered as unsuitable for use. The term "souring" as used herein is intended to cover such deterioration of the mud, however evidenced.

As a result of the above-explained test as correlated with field operations, it has been found that spoiling in all concentrations at less than one week indicates that the preservative is of no value; that spoiling at an intermediate time indicates an incomplete inhibition of the bacterial action and a low degree of residual toxicity; that samples that are still sweet after three weeks from the original test can be explained by the fact that a complete kill may have been accomplished by the original treatment, or there was not a complete kill by the original treatment but a sufficiently toxic condition was developed to suppress bacterial growth. The two can be separated by the additional inoculation and the subsequent test of the samples.

Under test conditions set up, the untreated or stock mud was found to sour and become unsatisfactory on the third day at room storage temperature.

After treatment in accordance with the present invention, the mud exhibits excellent primary preservation properties and a high degree of resistance to contamination. For example, the following table lists the results of a series of tests performed on the foregoing mud after treatment with the indicated quantities of tetra ortho tolyl silicate:

*Water loss cc./hr. at 100 p. s. i.*

| Conc. tetra-o-tolyl silicate, lb./bbl. | Primary Test | | | Recontamination Test | | |
|---|---|---|---|---|---|---|
| | 1 week | 2 weeks | 3 weeks | 1 week | 2 weeks | 3 weeks |
| 1 | 6.7 | 5.2 | 5.7 | 5.6 | 6.4 | 6.5 |
| 2 | 7.0 | 5.4 | 5.8 | 5.6 | 6.3 | 6.0 |
| 3 | 7.2 | 5.3 | (¹) | 5.5 | 6.0 | (¹) |
| 5 | 7.6 | 5.4 | 5.7 | 5.3 | 5.8 | 5.6 |

¹ Sample lost.

From the foregoing, it is apparent that the treatment is not only effective from the standpoint of the primary test, but definitely exhibits sustained toxicity to recontamination. Thus the primary test establishes the essentially complete kill by the original treatment whereas the subsequent test results recorded after reinoculation signifies an existing toxic condition sufficient to suppress the activity of the added bacteria. In short, the treated mud continuously maintains its preservative action against the encroachment of additional bacteria and is not subject to material deterioration or loss of potency Therefore, the treated muds not only possess kill characteristics, but also are inherently unfavorable for the growth of bacteria so that the preservative effect is retained over long periods of time.

The silicates herein referred to are either not subject to adsorption by the clay colloid, or if adsorbed, the effective portion thereof is apparently available or active so that it remains effective despite the adsorption.

While the foregoing example is typical of the amounts of the silicate that may be used in the average muds, it is to be understood, of course, that such muds vary widely in characteristics and that in many cases a quantity of the derivative required will be dictated by the characteristics of the mud and the type of formations traversed during drilling. Though the proportions may vary over wide ranges, no hard and fast rule may be applied. Usually it is desirable to set up an original charge from 0.5 to 2 pounds per barrel although in extreme cases, as previously indicated, somewhat larger concentrations may be desirable.

Periodic make-up supplementation of from $\frac{1}{10}$ to $\frac{1}{3}$ pound per barrel may be practiced at convenient intervals, as for example, daily or weekly in accordance with such factors as the quantity of mud consumed.

As above indicated, the concentration of the preservation has no material effect upon the ordinary characteristics of the mud such as its viscosity or gel properties, and, therefore, does not impair ordinary mud formulation.

The results are believed particularly surprising in view of the inability of other high activity bactericidal agents, referred to above, to exhibit any reasonable effectiveness as preservatives in drilling muds. The failure of these latter starch muds is believed due to the highly complex nature of the colloidal systems developed by drilling mud complexes containing starch and the like.

Obviously, many modifications and variations of the invention as herein set forth may be made without departing from the spirit and scope thereof, and therefore, only such limitations should be imposed as are indicated in the appended claims.

I claim:

1. A mud-laden aqueous drilling fluid containing starch and an additive comprising a tetra aryl silicate of the class consisting of tetra phenyl silicate and the homologs thereof in which the phenyl group may be substituted by no more than two methyl groups, said additive being present in sufficient amounts to inhibit fermentation thereof.

2. A mud-laden aqueous drilling fluid containing starch, and comprising tetra tolyl silicate in sufficient amount to inhibit fermentation thereof and maintain a relatively low water loss characteristic.

3. A mud-laden aqueous drilling fluid containing starch, and comprising tetra phenyl silicate in sufficient amount to inhibit fermentation thereof and maintain a relatively low water loss characteristic.

4. A mud-laden aqueous drilling fluid containing starch, and comprising tetra xylyl silicate in sufficient amount to inhibit fermentation thereof and maintain a relatively low water loss characteristic.

5. A mud-laden aqueous drilling fluid containing starch, and comprising tetra-o-tolyl silicate in sufficient amount to inhibit fermentation thereof and maintain a relatively low water loss characteristic.

6. In the process of drilling a well with well drilling tools wherein there is circulated in the well a water base drilling mud containing colloidal particles of clayey material, suspended in sufficient water to render the same circulatable, and starch, the method of inhibiting fermentation of said starch and forming a filter cake on the wall of said well to decrease the loss of fluid from said drilling mud into subsurface formations which comprises admixing said drilling mud with a tetra aryl silicate of the class consisting of tetra phenyl silicate and the homologs thereof in which each phenyl group may be substituted by no more than two methyl groups in an amount sufficient to inhibit fermentation of said starch and maintain a relatively low water loss characteristic.

7. The method according to claim 6 wherein said silicate is tetra tolyl silicate.

8. The method according to claim 6 wherein said silicate is tetra-o-tolyl silicate.

References Cited in the file of this patent

UNITED STATES PATENTS

| Number | Name | Date |
| --- | --- | --- |
| 2,271,695 | Jones | Feb. 3, 1942 |